United States Patent
Wang

(10) Patent No.: US 10,616,544 B2
(45) Date of Patent: *Apr. 7, 2020

(54) WHITE BALANCE PROCESSING METHOD, ELECTRONIC DEVICE AND COMPUTER READABLE STORAGE MEDIUM

(71) Applicant: GUANGDONG OPPO MOBILE TELECOMMUNICATIONS CORP., LTD., Dongguan, Guangdong (CN)

(72) Inventor: Huichao Wang, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/433,033

(22) Filed: Jun. 6, 2019

(65) Prior Publication Data
US 2019/0289267 A1 Sep. 19, 2019

Related U.S. Application Data

(63) Continuation of application No. 16/121,531, filed on Sep. 4, 2018.

(30) Foreign Application Priority Data

Oct. 30, 2017 (CN) .......................... 2017 1 1033365

(51) Int. Cl.
*H04N 9/73* (2006.01)
*G06K 9/46* (2006.01)
(Continued)

(52) U.S. Cl.
CPC .............. *H04N 9/73* (2013.01); *G06K 9/4647* (2013.01); *G06K 9/6256* (2013.01); *G06K 9/6265* (2013.01); *H04N 5/2351* (2013.01)

(58) Field of Classification Search
None
See application file for complete search history.

(56) References Cited

U.S. PATENT DOCUMENTS 6,379,022 B1 * 4/2002 Amerson ........... H05B 33/0863
362/1
7,372,499 B2 * 5/2008 Kawakami ............. G03B 15/05
348/370

(Continued)

FOREIGN PATENT DOCUMENTS

CN 1839634 9/2006
CN 101146233 3/2008
(Continued)

OTHER PUBLICATIONS

SIPO, First Office Action for CN Application No. 201711033365, dated Dec. 26, 2018.
(Continued)

*Primary Examiner* — Cynthia Segura
(74) *Attorney, Agent, or Firm* — Hodgson Russ LLP

(57) ABSTRACT

The present disclosure provides a white balance processing method including processing an image to obtain a color of a light source contained in a scene corresponding to the image; determining whether the color of the light source is identical to a natural color of an object contained in the scene; when the color of the light source is identical to the natural color of the object, determining a type of the scene and performing a white balance processing on the image according to the type of the scene; and when the color of the light source is different from the natural color of the object, determining color temperature of the light source contained in the scene according to the color of the light source and performing the white balance processing on the image according to the color temperature of the light source.

20 Claims, 9 Drawing Sheets

(51) Int. Cl.
*G06K 9/62* (2006.01)
*H04N 5/235* (2006.01)

(56) References Cited

U.S. PATENT DOCUMENTS

| | | | | |
|---|---|---|---|---|
| 8,503,771 | B2* | 8/2013 | Masato | H04N 9/735 |
| | | | | 382/162 |
| 8,559,713 | B2* | 10/2013 | Watanabe | H04N 1/6027 |
| | | | | 382/167 |
| 2002/0106206 | A1* | 8/2002 | Takeshita | H04N 1/6077 |
| | | | | 396/429 |
| 2003/0142496 | A1* | 7/2003 | Bloom | G02B 5/22 |
| | | | | 362/293 |
| 2005/0195290 | A1* | 9/2005 | Takeshita | H04N 9/735 |
| | | | | 348/223.1 |
| 2006/0159336 | A1* | 7/2006 | Uezono | H04N 9/735 |
| | | | | 382/167 |
| 2006/0232684 | A1* | 10/2006 | Miki | H04N 9/735 |
| | | | | 348/223.1 |
| 2007/0103646 | A1* | 5/2007 | Young | G01J 1/32 |
| | | | | 353/52 |
| 2009/0021602 | A1* | 1/2009 | Fujiwara | H04N 5/23219 |
| | | | | 348/223.1 |
| 2010/0141811 | A1 | 6/2010 | Gotanda | |
| 2010/0194918 | A1 | 8/2010 | Zhang et al. | |
| 2010/0259686 | A1* | 10/2010 | Kao | H04N 9/73 |
| | | | | 348/658 |
| 2012/0014598 | A1 | 1/2012 | Nakagawa et al. | |
| 2012/0281108 | A1* | 11/2012 | Fukui | H04N 5/144 |
| | | | | 348/223.1 |
| 2013/0155276 | A1* | 6/2013 | Ueda | G02B 7/36 |
| | | | | 348/223.1 |
| 2013/0242130 | A1* | 9/2013 | Peng | H04N 9/735 |
| | | | | 348/223.1 |
| 2014/0071310 | A1 | 3/2014 | Kai | |
| 2014/0198261 | A1* | 7/2014 | Yamaguchi | H04N 9/3114 |
| | | | | 348/744 |
| 2015/0181662 | A1* | 6/2015 | Ghoshal | G01J 1/4204 |
| | | | | 315/149 |
| 2015/0271460 | A1* | 9/2015 | Jung | H04N 9/735 |
| | | | | 348/225.1 |
| 2016/0007001 | A1* | 1/2016 | Kuchiki | H04N 9/735 |
| | | | | 348/223.1 |
| 2016/0027190 | A1* | 1/2016 | Minagawa | G06T 5/001 |
| | | | | 382/167 |
| 2017/0332061 | A1* | 11/2017 | Lee | H04N 5/2258 |
| 2018/0374408 | A1* | 12/2018 | Ma | G09G 3/2003 |
| 2019/0289267 | A1* | 9/2019 | Wang | G06K 9/4647 |

FOREIGN PATENT DOCUMENTS

| | | |
|---|---|---|
| CN | 101350883 | 1/2009 |
| CN | 103227928 | 7/2013 |
| CN | 103250418 | 8/2013 |
| CN | 105282530 | 1/2016 |
| CN | 106231193 | 12/2016 |
| CN | 107801012 | 3/2018 |
| EP | 1331828 | 7/2003 |
| JP | 2000113215 | 4/2000 |
| JP | 2007013415 | 1/2007 |

OTHER PUBLICATIONS

WIPO, English translation of the ISR and WO for PCT/CN2018/109406, dated Dec. 28, 2018.

EPO, Office Action for EP Application No. 18197535, dated Mar. 25, 2019.

SIPO, Notification to Grant Patent Right for Invention for CN Application No. 201711033365, dated Mar. 27, 2019.

* cited by examiner

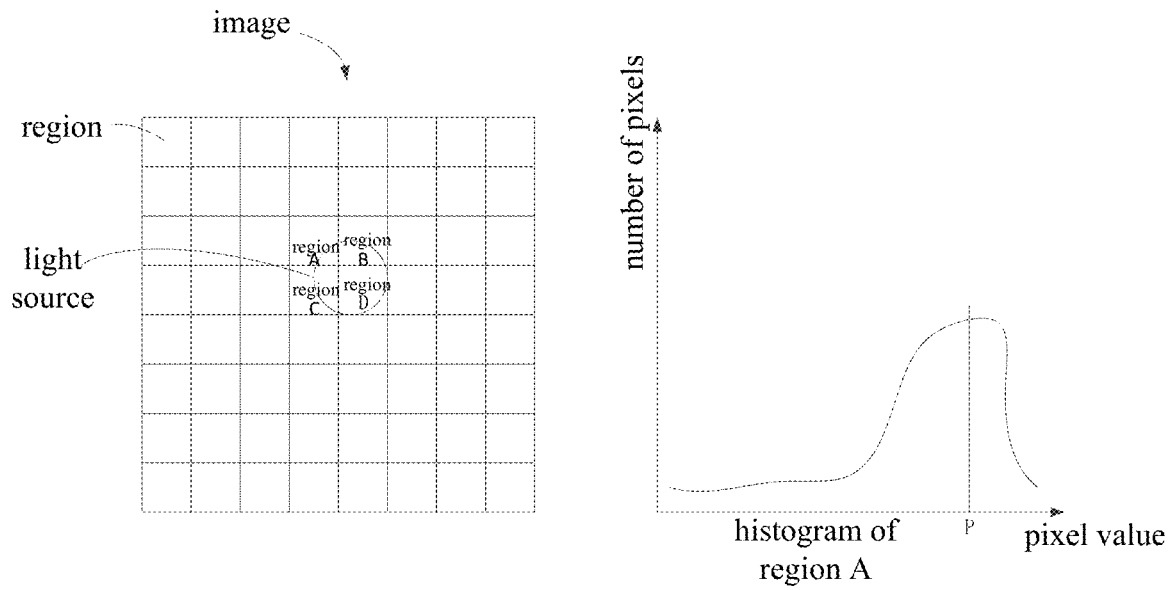

Fig. 4 determining a high brightness region and a middle brightness region according to a brightness distribution along a radial direction from a center of the light source contained in the scene — S112 subtracting averaged pixel values of primary color channels of the middle brightness region from averaged pixel values of primary color channels of the high brightness region to determine the color of the light source contained in the scene — S114

Fig. 5

WHITE BALANCE PROCESSING METHOD, ELECTRONIC DEVICE AND COMPUTER READABLE STORAGE MEDIUM

CROSS REFERENCE TO RELATED APPLICATION

This application is a continuation of a U.S. application Ser. No. 16/121,531, filed Sep. 4, 2018, which is based on and claims priority to Chinese Patent Application No. 201711033365.4, filed Oct. 30, 2017. The entire contents of the aforementioned applications are incorporated herein by reference.

TECHNICAL FIELD

The present disclosure relates to the field of the image processing technologies, and more particular to a white balance processing method, a white balance processing device, an electronic device and a computer readable storage medium.

BACKGROUND

White balance technique in related arts may perform a white balance processing according to color temperature of light source contained in a scene by detecting the color temperature of the light source in the scene corresponding to an image.

SUMMARY

A white balance processing method according to implementations of the present disclosure includes: processing an image to obtain a color of a light source contained in a scene corresponding to the image; determining whether the color of the light source is identical to a natural color of an object contained in the scene; in response to determining that the color of the light source is identical to the natural color of the object contained in the scene, determining a type of the scene and performing a white balance processing on the image according to the type of the scene; and in response to determining that the color of the light source is different from the natural color of the object contained in the scene, determining color temperature of the light source contained in the scene according to the color of the light source and performing the white balance processing on the image according to the color temperature of the light source.

An electronic device according to implementations of the present disclosure includes one or more processors, a memory and one or more programs. The one or more programs are stored in the memory and are configured to be executable by the one or more processors. The one or more programs include instructions for executing the white balance processing method.

A computer readable storage medium according to implementations of the present disclosure includes computer programs cooperating with an electronic device. The computer programs are executed by a processor to execute the white balance processing method.

BRIEF DESCRIPTION OF THE DRAWINGS

These and other aspects and advantages of embodiments of the present disclosure will become apparent and more readily appreciated from the following descriptions made with reference to the drawings, in which:

FIG. 4 is a schematic diagram illustrating a scenario for performing a white balance processing according to some implementations of the present disclosure;

FIG. 5 is a flow chart illustrating a white balance processing method according to some implementations of the present disclosure;

DETAILED DESCRIPTION

Figure 1:
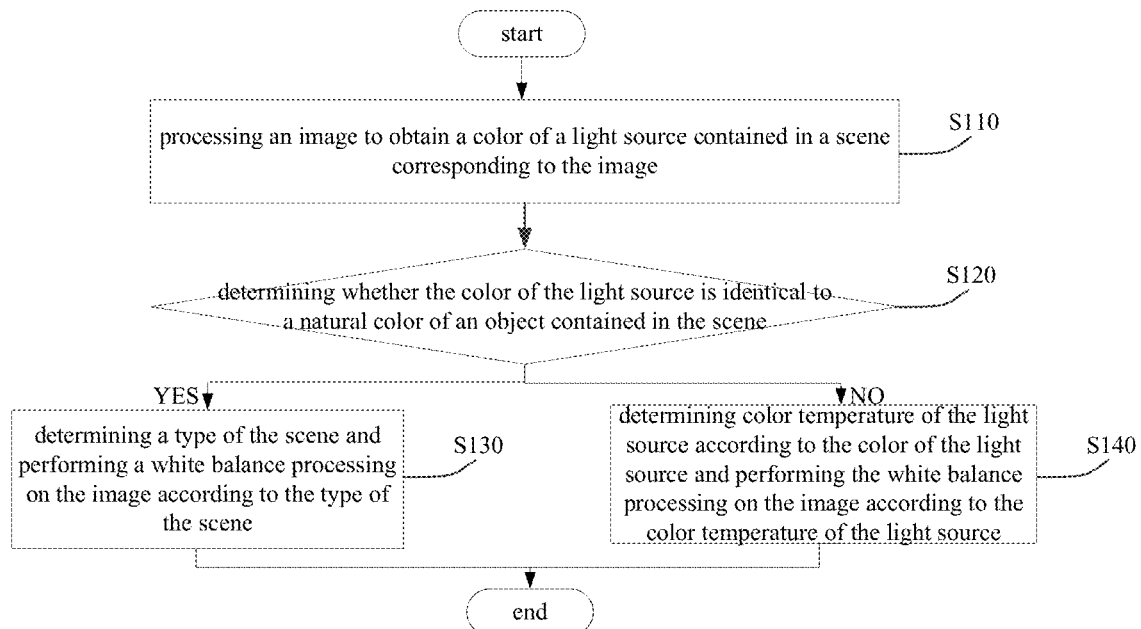
FIG. 1 is a flow chart illustrating a white balance processing method according to some implementations of the present disclosure.

Descriptions will be made in detail to implementations of the present disclosure and examples of the implementations are illustrated in drawings. The same or similar elements and the elements having same or similar functions are denoted by like reference numerals throughout the descriptions. The implementations described herein with reference to drawings are explanatory, are used to understand the implementations of the present disclosure, and are not be construed to limit the implementations of the present disclosure.

In related arts, when a color of a light source is identical to a color of an object contained in a scene, performing the white balance processing according to detected color temperature of the light source easily make the object be contained in the image grayish, thereby having poor white balance effect.

Embodiments of the present disclosure provide a white balance processing method, a white balance processing device, an electronic device and a non-transitory computer readable storage medium.

The white balance processing method according to implementations of the present disclosure includes: processing an image to obtain a color of a light source contained in a scene corresponding to the image; determining whether the color of the light source is identical to a natural color of an object contained in the scene; in response to determining that the color of the light source is identical to the natural color of the object contained in the scene, determining a type of the scene and performing a white balance processing on the image according to the type of the scene; and in response to determining that the color of the light source is different from the natural color of the object contained in the scene, determining color temperature of the light source contained in the scene according to the color of the light source and performing the white balance processing on the image according to the color temperature of the light source.

The white balance processing device according to implementations of the present disclosure includes: a first processing module, configured to process an image to obtain a color of a light source contained in a scene corresponding to the image; a first judging module, configured to determine whether the color of the light source is identical to an natural color of an object contained in the scene; a second processing module, configured to determine a type of the scene and perform a white balance processing on the image according to the type of the scene, in response to determining that the color of the light source is identical to the natural color of the object contained in the scene; and a third processing module, configured to determine color temperature of the light source contained in the scene according to the color of the light source and perform the white balance processing on the image according to the color temperature of the light source, in response to determining that the color of the light source is different from the natural color of the object contained in the scene.

The electronic device according to implementations of the present disclosure includes one or more processors, a memory and one or more programs. The one or more programs are stored in the memory and are configured to be executable by the one or more processors. The one or more programs include instructions for executing the white balance processing method.

The non-transitory computer readable storage medium according to implementations of the present disclosure includes computer programs cooperating with an electronic device. The computer programs are executed by a processor to execute the white balance processing method.

With the white balance processing method, the white balance processing device, the electronic device and the computer readable storage medium according to implementations of the present disclosure, when the color of the light source is identical to the natural color of the object contained in the scene, the type of the scene is determined and the white balance processing is performed on the image according to the type of the image. Therefore, a color presented by the object contained in the image subjected to the white balance processing is close to the real-world color of the object contained in the scene.

Referring to FIG. 1, a white balance processing method according to an implementation of the present disclosure includes the followings.

In block S110, an image is processed to obtain a color of a light source contained in a scene corresponding to the image.

In block S120, it is determined whether a color of the light source is identical to a natural color of an object contained in the scene.

In block S130, when the color of the light source is identical to the natural color of the object contained in the scene, a type of the scene is determined and a white balance processing is performed on the image according to the type of the scene.

In Block S140, when the color of the light source is different from the natural color of the object contained in the scene, color temperature of the light source is determined according to the color of the light source and the white balance processing is performed on the image according to the color temperature of the light source.

With the white balance processing method, the white balance processing device 100 and the electronic device 1000 according to implementations of the present disclosure, when the color of the light source is identical to the natural color of the object contained in the scene, the type of the scene is determined and the white balance processing is performed on the image according to the type of the scene. Therefore, the color presented by the object contained in the image subjected to the white balance processing may be close to the real-world color of the object contained in the scene.

In some implementations, the natural color of the object contained in the scene refers to a color presented by the object contained in an actual scene and illuminated with a standard white light. The standard white light may refer to a white light including a red-component value, green-component value and blue-component value that are equal to each other, i.e. R:G:B=1:1:1. The color temperature of the standard white light may be about 5500K.

In some implementations, determining the color temperature of the light source contained in the scene according to the color of the light source may include the followings. The color temperature of the light source may be determined according to the color of the light source and a correspondence between colors of light sources and color temperature of light sources. The correspondence between colors of light sources and color temperature of light sources may be a mapping table or a color temperature curve.

Figure 2:
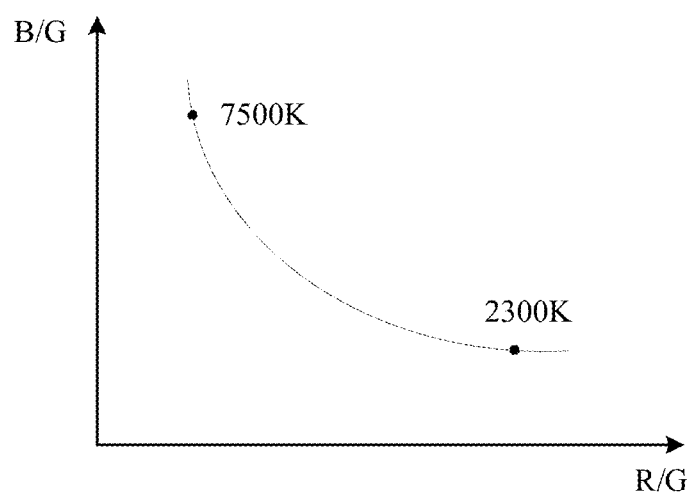
FIG. 2 is a color temperature curve according to some implementations of the present disclosure.

Referring to FIG. 2, in one embodiment, images may be obtained under illumination with standard light boxes having color temperature of 3000K, 4000K and 5000K, and the colors of the light sources under the above color temperature may be determined by performing a calculation. Therefore, the color temperature curve between colors of light sources and color temperature of light sources is obtained. The color temperature curve may be stored in the electronic device 1000. The color temperature of the light source may be obtained by performing a search on the color temperature curve based on the color of the light source.

In some implementations, a correspondence between color temperature of light sources and white balance parameters is stored in advance in the electronic device 1000. After the color temperature of the light source is obtained according to the color of the light source, the white balance parameter may be obtained by performing a search on the correspondence between color temperature of light sources and white balance parameters based on the color temperature of the light source. Therefore, the white balance processing may be performed on the image according to the white balance parameter.

Figure 3:
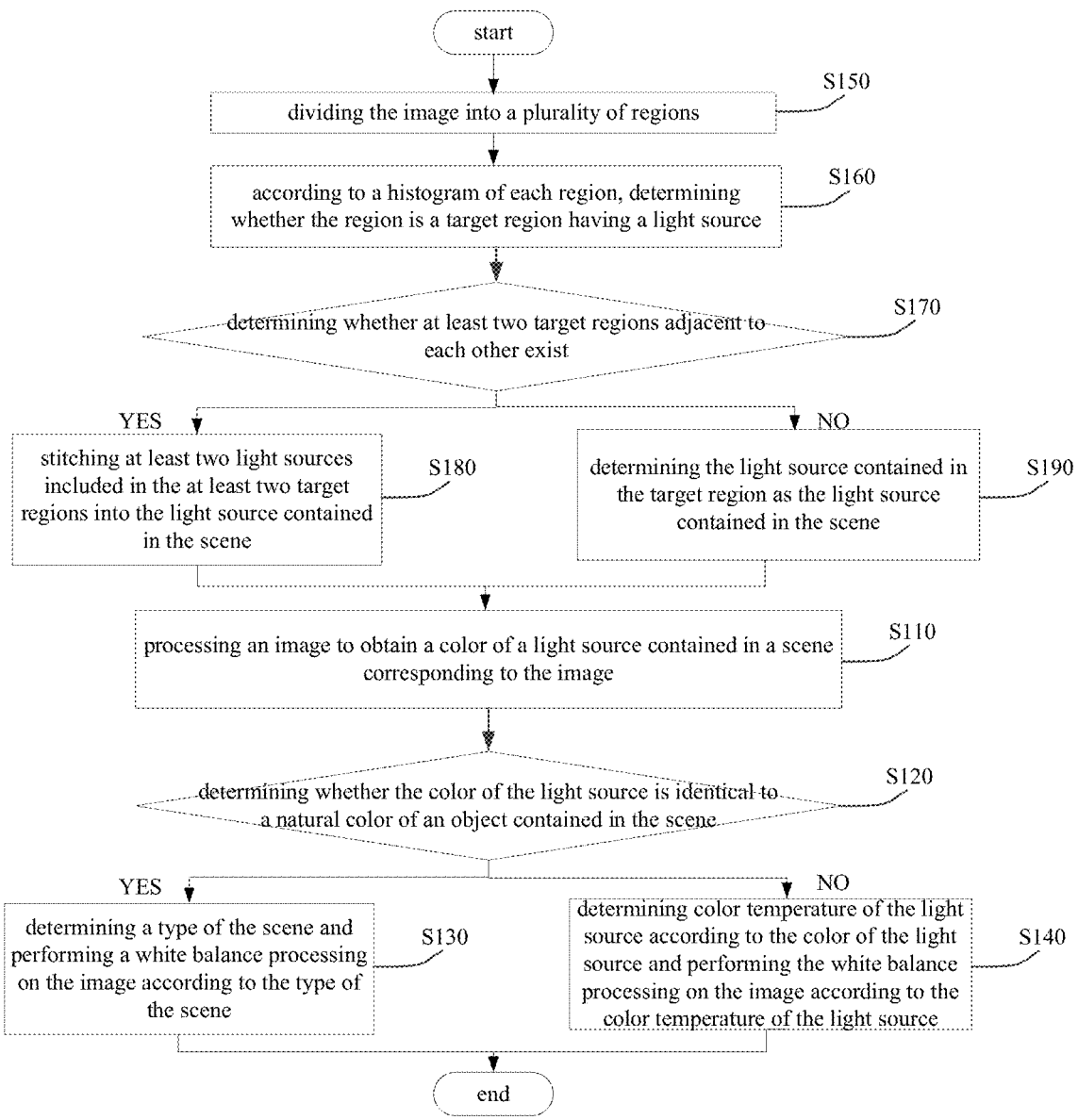
FIG. 3 is a flow chart illustrating a white balance processing method according to some implementations of the present disclosure.

Referring to FIG. 3, in some implementations, before the block S110, the white balance processing method includes the followings.

In block S150, the image is divided into a plurality of regions.

In block S160, according to a histogram of each region, it is determined whether the region is a target region having the light source.

In block S170, it is determined whether at least two target regions adjacent to each other exist.

In block S180, when the at least two target regions adjacent to each other exist, at least two light sources contained in the at least two target regions are stitched into the light source contained in the scene.

In block S190, when the at least two target regions adjacent to each other do not exist, the light source contained in the target region is determined as the light source contained in the scene.

Therefore, a position of the light source in the image may be determined.

Specifically, the image may be divided into a plurality of regions. For example, the image may be divided into 64*48 regions. According to the histogram of each region, it may be determined whether, in each region, a ratio of the number of pixels exceeds a predetermined ratio. The pixels each has a pixel value greater than a predetermined pixel value P. For example, the predetermined pixel value P may be about 239, and the predetermined ratio may be about 5%. That is, it is determined whether the ratio of the number of pixels exceeds 5%. The pixels each has the pixel value greater than 239. The region corresponding to the ratio of the number of pixels each having the pixel value greater than 239 exceeding 5% is determined as the target region having the light source. It is determined whether the target region exists in the image, and when the target region exists in the image, it is indicated that the light source is contained in the scene corresponding to the image. When the target region does not exist in the image, it is indicated that no light source is contained in the scene corresponding to the image. When the target region exists in the image, it is determined whether at least two target regions adjacent to each other exist. When the at least two target images exist, at least two light sources contained in the at least two target regions are parts of a same light source. Therefore, the at least two light sources contained in the at least two target regions may be stitched into a single light source. When the at least two target regions do not exist, the light source contained in the target region is determined as the light source contained in the scene. Therefore, the position of the light source may be determined based on the one or more target regions.

Referring to FIG. 4, in an example, it may be determined that the region A, the region B, the region C and the region D each are the target region having the light source according to the histogram of each region. For example, based on the histogram of the region A, it may be determined that the ratio of pixels each having the pixel value greater than the predetermined pixel value P exceeds the predetermined ratio. Since the region A, the region B, the region C and the region D are target regions adjacent to each other, the light sources contained in the region A, the region B, the region C and the region D are stitched into a single light source.

Figure 6:
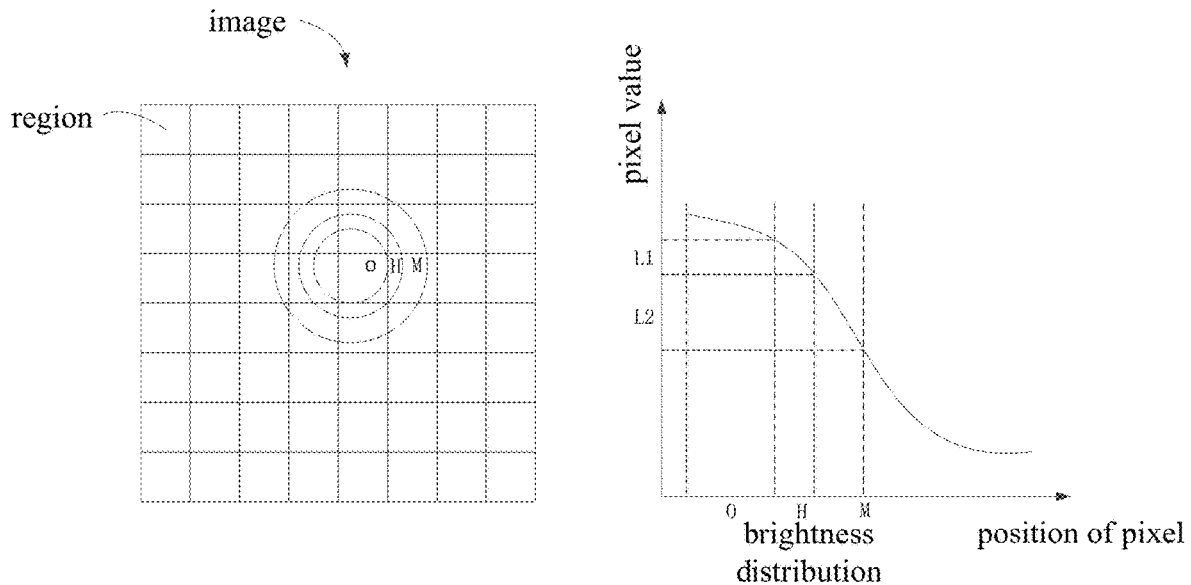
FIG. 6 is a schematic diagram illustrating a scenario for performing a white balance processing according to some implementations of the present disclosure.

Referring to FIGS. 5 and 6, in some implementations, the block S110 may include the followings.

In block S112, a high brightness region H and a middle brightness region M are determined according to a brightness distribution along a radial direction from a center O of the light source.

In block S114, the color of the light source is determined by subtracting averaged pixel values of primary color channels of the middle brightness region M from averaged pixel values of primary color channels of the high brightness region H.

Therefore, the color of the light source may be determined according to the high brightness region H and the middle brightness region M.

Referring to FIG. 6 again, the position of the light source in the image may be determined. It may be understood that, the center O of the light source contained in the image is over-exposed, which is generally a big white spot and excludes any information of the color of the light source. The color of the light source may be determined according to the averaged pixel values of primary color channels of the high brightness region H and the averaged pixel values of primary color channels of the middle brightness region M. The high brightness region H may refer to a region defined by pixels each having a brightness value within a first brightness range L1 along the radial direction from the center of the light source. The first brightness range L1 is for example [200, 239). The middle brightness region M may refer to a region defined by pixels each having a brightness value within a second brightness range L2 along the radial direction from the center of the light source. The second brightness range L2 is for example [150, 200). It is to be noted that, the first brightness range L1 and the second brightness range L2 may be determined according to the brightness distribution along the radial direction from the center of light source. For example, when the brightness of the light source is attenuated rapidly, the first brightness range L1 and the second brightness range L2 may be suitably increased. For example, when the brightness of the light source is attenuated slowly, the first brightness range L1 and the second brightness range L2 may be suitably decreased.

In some implementations, the primary color channel refers to a channel with a primary color, for example, at least one of a red (R) channel, a green-red (Gr) channel, a green-blue (Gb) channel and a blue (B) channel. In some implementations, the pixel value of the green (G) channel may be obtained based on the pixel value of the green-red (Gr) channel and the pixel value of the green-blue (Gb) channel. An averaged pixel value for each of the primary color channels may refer to an arithmetic average of a plurality of pixel values for that primary color channels. The plurality of pixel values may be pixel values of all pixels included in the high brightness region or in the middle brightness region. In an example, averaged pixel values of the primary color channels ($R_{avg}$, $G_{avg}$, $B_{avg}$) of the high brightness region are (200, 210, 220), while the averaged pixel values of the primary color channels ($R_{avg}$, $G_{avg}$, $B_{avg}$) of the middle brightness region are (160, 180, 190), and the pixel values of red, green and blue channels (R, G, B) of the light source are (200-160, 210-180, 220-190), i.e., (40, 30, 30).

Figure 7:
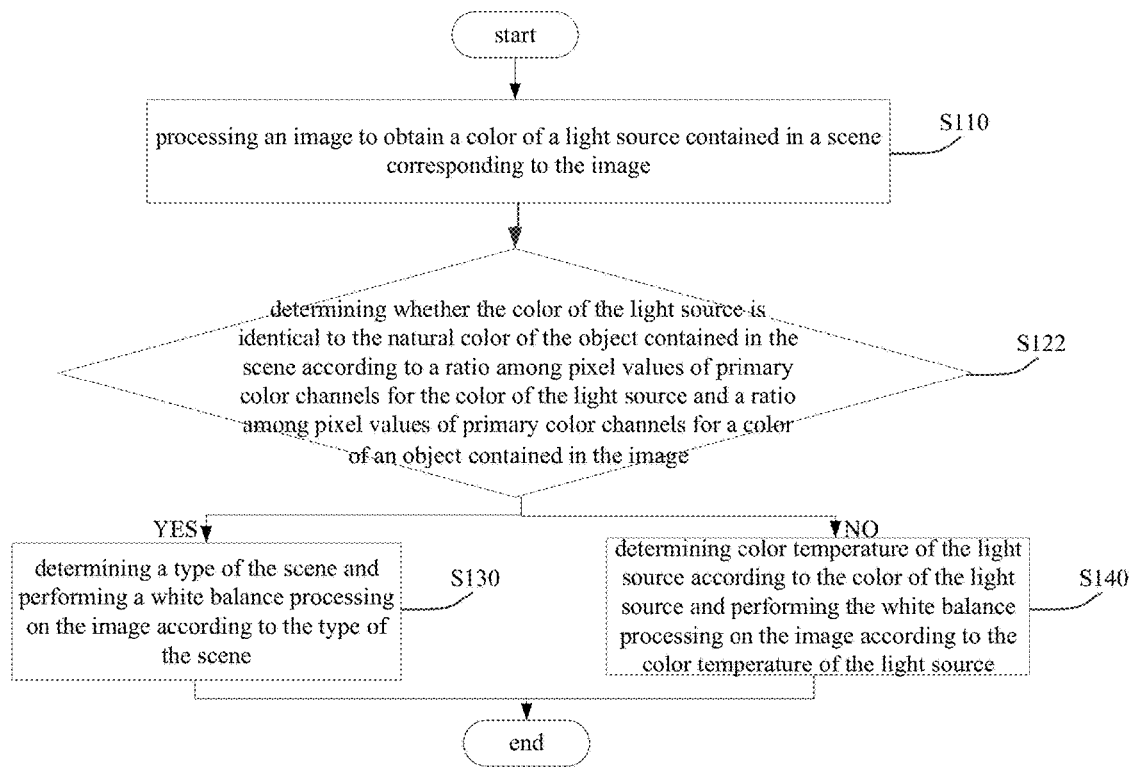
FIG. 7 is a flow chart illustrating a white balance processing method according to some implementations of the present disclosure.

Referring to FIG. 7, in some implementations, the block S120 may include the followings.

In block S122, it is determined whether the color of the light source is identical to an natural color of the object in the scene according to a ratio among pixel values of primary color channels for the color of the light source and a ratio among pixel values of primary color channels for the color of the object in the image.

Therefore, whether the color of the light source is identical to the natural color of the object contained in the scene may be determined according to the color of the light source and the color of the object contained in the image.

Specifically, the color of the object contained in the image may be obtained by superimposing the color of the light source and the natural color of the object contained in the scene. The color of the object contained in image refers to a color presented by the object contained in the image. It is determined whether the color of the object contained in the image is identical to the color of the light source, and when the color of the object contained in the image is different from the color of the light source, it is determined that the natural color of the object contained in the scene is different from the color of the light source. When the color of the object contained in the image is identical to the color of the light source, it is determined that the natural color of the object contained in the scene is identical to the color of the light source or the natural color of the object contained in the scene is white (i.e., the pixel values of the three primary color channels R, G and B are identical to each other). When the color of the object contained in the image is identical to the color of the light source, it is determined whether the ratio among the pixel values of the primary color channels for the color of the object contained in the image is identical to the ratio among the pixel values of the primary color channels for the color of the light source. When the ratio among the pixel values of the primary color channels for the color of the object contained in the image is identical to the ratio among the pixel values of the primary color channels of the color of the light source, it is determined that the color of the light source is identical to the natural color of the object contained in the scene. When the ratio among the pixel values of the primary color channels for the color of the object contained in the image is different from the ratio among the pixel values of the primary color channels for the color of the light source, it is determined that the color of the light source is different from the natural color of the object contained in the scene.

In an embodiment, the pixel values of the primary color channels (R, G, B) for the color of the light source are (40, 30, 30). The ratio among the pixel values of the primary color channels is 4:3:3. The pixel values of the primary color channels (R, G, B) for the color of the object contained in the image are (80, 60, 60). The ratio among pixel values of the primary color channels (R, G, B) is also 4:3:3. Therefore, it may be determined that the color of the light source is identical to the natural color of the object contained in the scene. In another embodiment, the pixel values of the primary color channels (R, G, B) for the color of the light source are (40, 30, 30). The ratio among the pixel values of the primary color channels is 4:3:3. The pixel values of the primary color channels (R, G, B) for the color of the object contained in the image are (50, 40. 40). The ratio among the pixel values of the primary color channels is 5:4:4. Therefore, it may be determined that the color of the light source is different from the natural color of the object contained in the scene.

Figure 8:
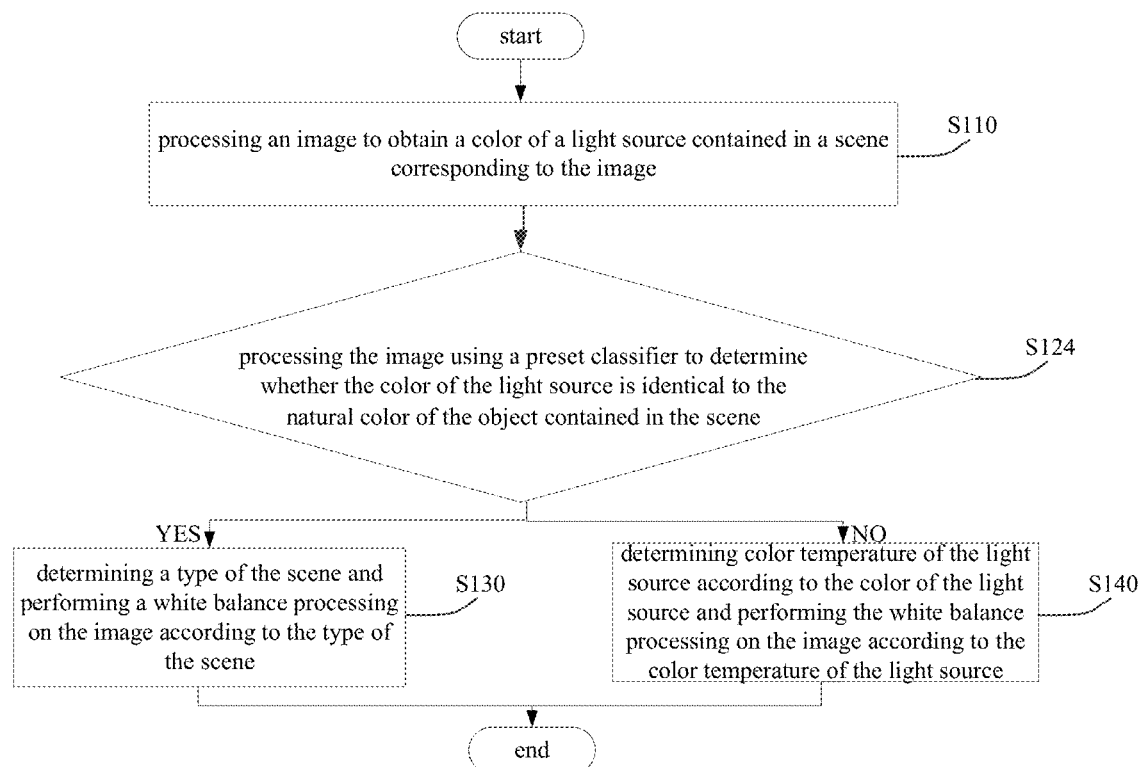
FIG. 8 is a flow chart illustrating a white balance processing method according to some implementations of the present disclosure.

Referring to FIG. 8, in some implementations, the block S120 includes the following.

In block S124, the image is processed using a preset classifier to determine whether the color of the light source is identical to the natural color of the object contained in the scene.

Therefore, whether the color of the light source is identical to the natural color of the object contained in the scene may be determined according to the preset classifier.

Specifically, the preset classifier may be obtained by performing training in a device with a powerful capacity of data processing. For example, the preset classifier may be obtained by performing training in a background server. Algorithms for training the preset classifier may include: neural network, machine learning and deep learning, such as decision tree, logistic regression, naive Bayes and the like.

In an embodiment, a plurality of frame images may be acquired. Each frame image includes a first mark for indicating that the color of the light source is identical to the natural color of the object contained in the scene and a second mark indicating that the color of the light source is different from the natural color of the object contained in the scene. An image having the first mark indicating that the color of the light source is identical to the natural color of the object contained in the scene may be called as a positive sample, while an image having the second mark indicating that the color of the light source is different from the natural color of the object contained in the scene may be called as a negative sample. Inclusion of the positive sample and the negative sample in the plurality of images may make the classifier more accurate. The plurality of images are divided into training samples and testing samples. The training samples are taken as an input of the algorithms of the classifier via the background server, to generate the classifier. The testing samples are input into the classifier to generate a predicted result indicating whether the color of the light source is identical to the natural color of the object contained in the scene. The classifier is corrected according to an accuracy of the predicted result, to obtain the preset classifier.

Figure 9:
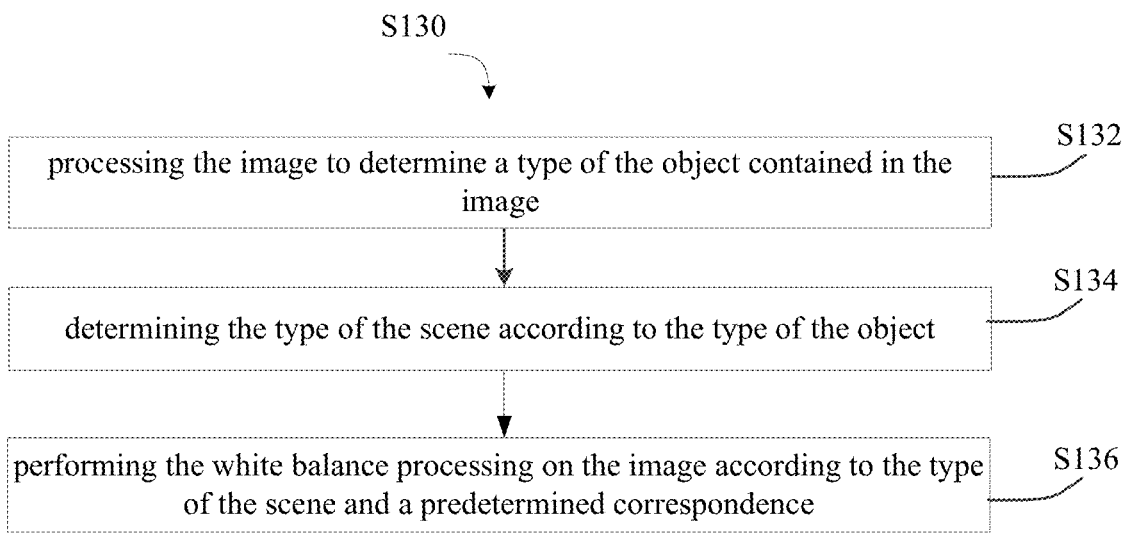
FIG. 9 is a flow chart illustrating a white balance processing method according to some implementations of the present disclosure.

Referring to FIG. 9, in some implementations, the block S130 includes the followings.

In block S132, the image is processed to determine a type of the object contained in the image.

In block S134, the type of the scene is determined according to the type of the object.

In block S136, the white balance processing is performed on the image according to the type of the scene and a predetermined correspondence.

Therefore, the white balance processing is performed on the image according to the type of the scene.

Specifically, the image is processed to determine the type of the object contained in the image. For example, the object contained in the image may be obtained by processing the image with AI (artificial intelligence) image recognition. The type of the object contained in the image includes plants (such as flowers, grass, trees, etc.), animals (such as lions, mice, cats, etc.), natural landscapes (such as rivers, mountains, etc.), human, buildings, and the like. The type of the scene may be determined according to the type of the object. For example, when the type of the object is recognized as a tree, it may be determined that the type of the scene is an outdoor type. Further, whether the type of the scene is a forest may be determined according to the amount of trees. For example, when the type of the object is a kind of tableware, it may be determined that the type of the scene is an indoor type. Further, it may be determined whether the type of the scene is a coffee house according to the type of the tableware (such as the tableware is a coffee cup). The white balance parameter corresponding to the type of the scene may be determined according to the correspondence between types of scenes and white balance parameters and based on the type of the scene. For example, when the type of the scene is a forest, the white balance parameter corresponding to the forest may be obtained. Since the color temperature of the forest is generally relatively high (i.e., the image inclines to blue), the white balance processing may be implemented by increasing a gain for the R channel and decreasing a gain for the B channel. For example, when the type of the scene is a coffee house, the white balance parameter corresponding to the coffee house may be acquired. Since the color temperature of the coffee house is generally relatively low (i.e., the image inclines to red), the white balance processing may be implemented by decreasing the gain for the red channel and increasing the gain for the B channel.

Embodiments of the present disclosure further provide a white balance processing device.

Figure 10:
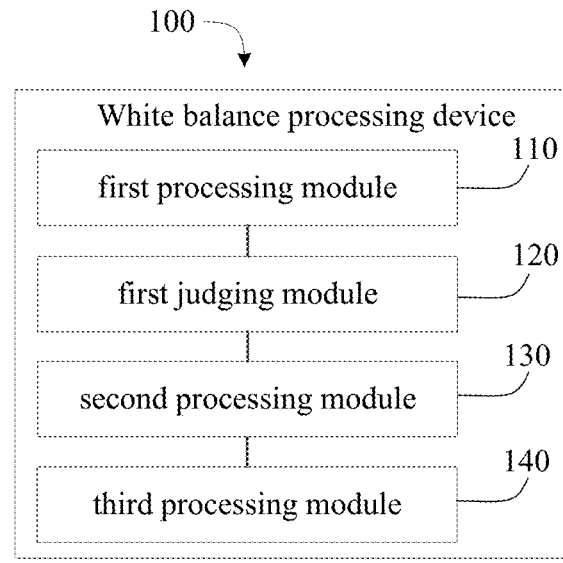
FIG. 10 is a block diagram illustrating a white balance processing device according to some implementations of the present disclosure.

Referring to FIG. 10, a white balance processing device 100 according to an implementation of the present disclosure includes a first processing module 110, a first judging module 120, a second processing module 130 and a third processing module 140. The first processing module 110 is configured to process an image to determine a color of a light source contained in a scene corresponding to the image. The first judging module 120 is configured to determine whether the color of the light source is identical to a natural color of an object contained in the scene. The second processing module 120 is configured to determine a type of the scene and perform a white balance processing on the image according to the type of the scene, when the color of the light source is identical to the natural color of the object contained in the scene. The third processing module 140 is configured to determine color temperature of the light source according to the color of the light source and perform the white balance processing on the image according to the color temperature of the light source, when the color of the light source is different from the natural color of the object contained in the scene.

The white balance processing method according to an implementation of the present disclosure may be implemented by the white balance processing device 100 according to an implementation of the present disclosure. The block S110 may be implemented by the first processing module 110. The block S120 may be implemented by the first judging module 120. The block S130 may be implemented by the second processing module 130. The block S140 may be implemented by the third processing module 140.

Figure 11:
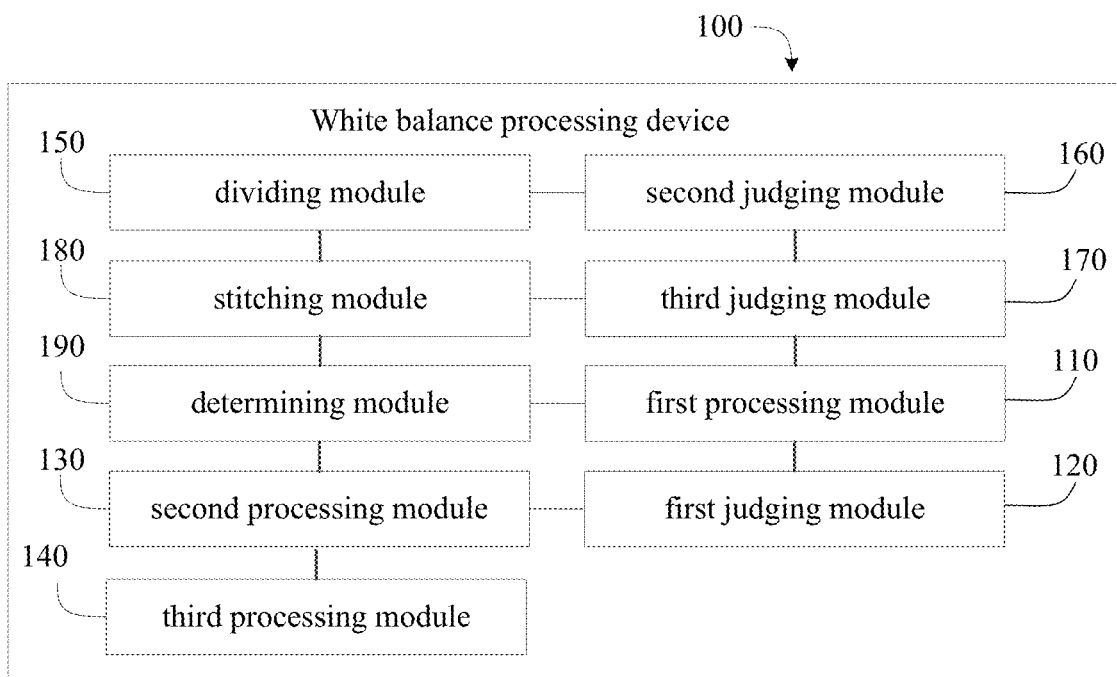
FIG. 11 is a block diagram illustrating a white balance processing device according to some implementations of the present disclosure.

Referring to FIG. 11, in some implementations, the white balance processing device 100 includes a dividing module 150, a second judging module 160, a third judging module 170, a stitching module 180 and a determining module 190. The dividing module 150 is configured to divide the image into a plurality of regions. The second judging module 160 is configured to, according to a histogram of each region, determine whether the region is a target region having the light source. The third judging module 170 is configured to determine whether at least two target regions adjacent to each other are presented. The stitching module 180 is configured to, when the at least two target regions adjacent to each other are presented, stitching at least two light sources contained in the at least two target regions into the light source contained in the scene. The determining module 190 is configured to, when the at least two target regions adjacent to each other are not presented, determine the light source contained in the target region as the light source contained in the scene.

That is to say, the block S150 may be implemented by the dividing module 150. The block S160 may be implemented by the second judging module 160. The block S170 may be implemented by the third judging module 170. The block S180 may be implemented by the stitching module 180. The block S190 may be implemented by the determining module 190.

Figure 12:
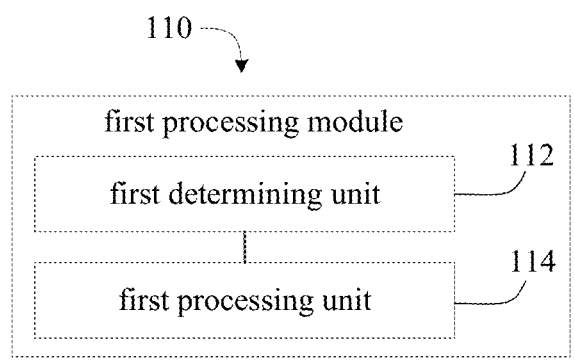
FIG. 12 is a block diagram illustrating a first processing module according to some implementations of the present disclosure.

Referring to FIGS. 12 and 6, in some implementations, the first processing module 110 includes a first determining unit 112 and a first processing unit 114. The first determining unit 112 is configured to determine a high brightness region H and a middle brightness region M according to a brightness distribution along a radial direction from a center O of the light source. The first processing unit 1144 is configured to determine the color of the light source by subtracting averaged pixel values of primary color channels of the middle brightness region H from averaged pixel values of primary color channels of the high brightness region M.

That is to say, the block S112 may be implemented by the first determining unit 112. The block S114 may be implemented by the first processing unit 114.

Referring to FIG. 10 again, in some implementations, the first judging module 120 is configured to determine whether the color of the light source is identical to an natural color of the object contained in the scene according to the a ratio among pixel values of primary color channels for the color of the light source and a ratio among pixel values of primary color channels for a color of an object contained in the image.

That is to say, the block S122 may be implemented by the first judging module 120.

Referring to FIG. 10 again, in some implementations, the first judging module 120 is configured to process the image using a preset classifier to determine whether the color of the light source is identical to the natural color of the object contained in the scene.

That is to say, the block S124 may be implemented by the first determining module 120.

Figure 13:
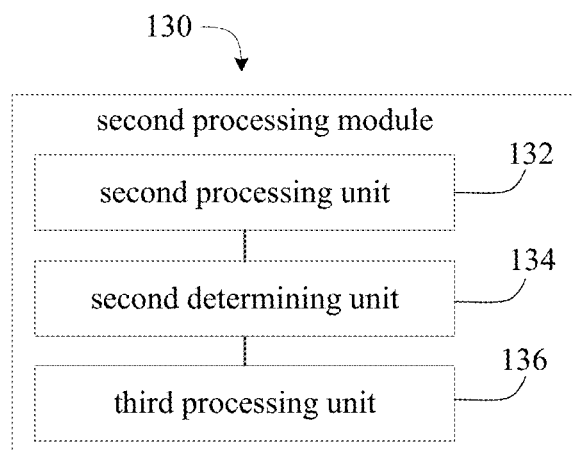
FIG. 13 is a block diagram illustrating a second processing module according to some implementations of the present disclosure.

Referring to FIG. 13, in some implementations, the second processing module 130 includes a second processing unit 132, a second determining unit 134 and a third processing unit 136. The second processing unit 132 is configured to process the image to determine a type of the object contained in the image. The second determining unit 134 is configured to determine the type of the scene according to the type of the object. The third processing unit 136 is configured to perform the white balance processing on the image according to the type of the scene and a predetermined correspondence.

That is to say, the block S132 may be implemented by the second processing unit 132. The block S134 may be implemented by the second determining unit 134. The block S136 may be implemented by the third processing unit 136.

Embodiments of the present disclosure further provide an electronic device.

Figure 14:
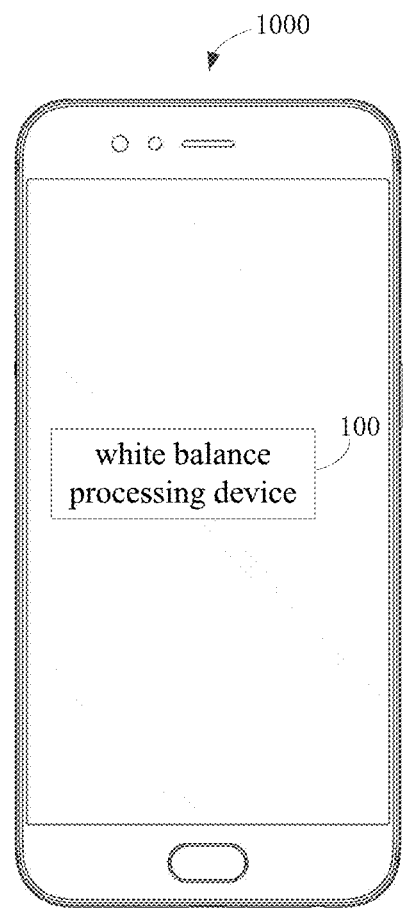
FIG. 14 is a plan view of an electronic device according to some implementations of the present disclosure.

Referring to FIG. 14, the white balance processing device 100 according to an implementation of the present disclosure may be integrated into an electronic device 1000 according to an implementation of the present disclosure. That is to say, the electronic device 1000 according to an implementation of the present disclosure may include the white balance processing device 100 according to an implementation of the present disclosure.

In some implementations, the electronic device 1000 includes a phone, a tablet computer, a laptop computer, a smart wrist strap, a smart watch, a smart helmet, smart glasses or the like.

Figure 15:
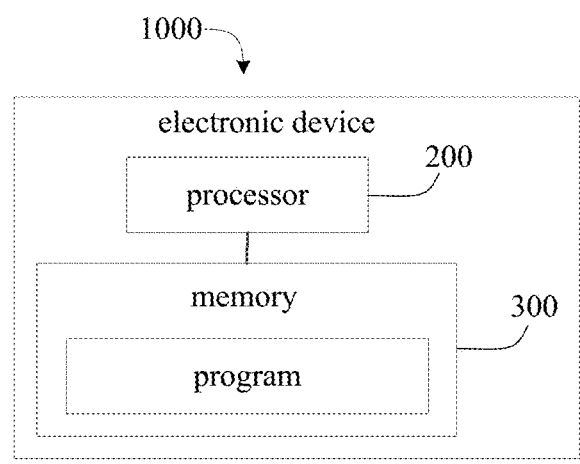
FIG. 15 is block diagram illustrating an electronic device according to some implementations of the present disclosure.

Referring to FIG. 15, an electronic device 1000 according to an implementation of the present disclosure includes one or more processors 200, a memory 300 and one or more programs. The one or more programs are stored in the memory 300 and are configured to be executable by the one or more processors 200. The one or more programs include instructions for implementing the white balance processing method according to any one of above implementations.

For example, the one or more programs include instructions for implementing the white balance processing method including the followings.

In block S110, an image is processed to obtain a color of a light source contained in a scene corresponding to the image.

In block S120, it is determined whether the color of the light source is identical to a natural color of an object contained in the scene.

In block S130, when the color of the light source is identical to the natural color of the object contained in the scene, a type of the scene is determined and white balance processing is performed on the image according to the type of the scene.

In block S140, when the color of the light source is different from the natural color of the object contained in the scene, color temperature of the light source contained in the scene is determined according to the color of the light source and the white balance processing is performed on the image according to the color temperature of the light source.

For example, the one or more programs include instructions for implementing the white balance processing method including the followings.

In block S150, the image is divided into a plurality of regions.

In block S160, according to a histogram of each region, it is determined whether a target region including a light source exists.

In block S170, it is determined whether at least two target regions adjacent to each other exist.

In block S180, in response to detecting that the at least two target regions adjacent to each other exist, at least two light sources contained in the at least two target regions are stitched into the light source contained in the scene.

In block S190, in response to detecting that the at least two target regions adjacent to each other do not exist, the light source contained in the target region is determined as the light source contained in the scene.

Figure 16:
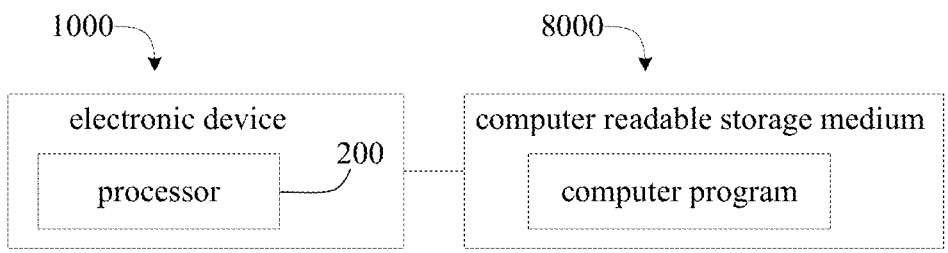
FIG. 16 is a schematic diagram illustrating a coupling between an electronic device and a computer readable storage medium according to some implementations of the present disclosure.

Referring to FIG. 16, a computer readable storage medium 8000 according to an implementation of the present disclosure includes a computer program cooperated with the electronic device 1000. The computer program may be executable by the one or more processors 200 to implement the white balance processing method according to any one of the above implementations.

In block S110, an image is processed to obtain a color of a light source contained in a scene corresponding to the image.

In block S120, it is determined whether the color of the light source is identical to a natural color of an object contained in the scene.

In block S130, when the color of the light source is identical to the natural color of the object contained in the scene, a type of the scene is determined and white balance processing is performed on the image according to the type of the scene.

In block S140, when the color of the light source is different from the natural color of the object contained in the scene, color temperature of the light source contained in the scene is determined according to the color of the light source and the white balance processing is performed on the image according to the color temperature of the light source.

For example, the computer program may also be executable by the one or more processors 200 to implement the white balance processing method including the followings.

In block S150, the image is divided into a plurality of regions.

In block S160, according to a histogram of each region, it is determined whether a target region including a light source exists.

In block S170, it is determined whether at least two target regions adjacent to each other exist.

In block S180, in response to detecting that the at least two target regions adjacent to each other exist, at least two light sources contained in the at least two target regions are stitched into the light source contained in the scene.

In block S190, in response to detecting that the at least two target regions adjacent to each other do not exist, the light source contained in the target region is determined as the light source contained in the scene.

In the description of the present disclosure, reference throughout this specification to "an embodiment", "some embodiments", "a schematic example", "an example", "a specific example" or "some examples" means that a particular feature, structure, material, or characteristic described in connection with the implementation or example is included in at least one implementation or example of the present disclosure. In the specification, schematic expressions of the above terms are not necessarily referring to the same embodiment or example of the present disclosure. Furthermore, the particular features, structures, materials, or characteristics may be combined in any suitable manner in one or more implementations or examples.

In addition, terms "first" and "second" are only used for purposes of description and are not intended to indicate or imply relative importance or the number of technical features. In addition, the feature defined with "first" and "second" may explicitly or implicitly comprise one or more this feature. In the description of the present disclosure, the term "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution may be different from that which is depicted or discussed, including executing functions in a substantially simultaneous manner or in an opposite order according to the related functions, which should be understood by those skilled in the art of the embodiments of the present disclosure.

The logic and/or steps described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to (a non-exhaustive list): an electronic connection (IPM overcurrent protection circuit) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the implementations of the present disclosure may be realized by the hardware, software, firmware or their combination. In the above implementations, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments are exemplary and cannot be construed to limit the present disclosure, and changes, modifications, alternatives, and variations can be made in the embodiments within the scope of the present disclosure.

What is claimed is:

1. A white balance processing method, comprising:
    processing an image to obtain a color of a light source contained in a scene corresponding to the image;
    determining whether the color of the light source is identical to a natural color of an object contained in the scene;
    in response to determining that the color of the light source is identical to the natural color of the object contained in the scene, determining a type of the scene, determining, according to the type of the scene, a white balance parameter corresponding to the type of the scene from a correspondence between the type of the scene and the white balance parameter, and performing a white balance processing on the image according to the white balance parameter; and
    in response to determining that the color of the light source is different from the natural color of the object contained in the scene, determining color temperature of the light source contained in the scene according to the color of the light source and performing the white balance processing on the image according to the color temperature of the light source.

2. The method according to claim 1, further comprising:
    dividing the image into a plurality of regions;
    according to a histogram of each region, determining whether the region is a target region having the light source;
    determining whether at least two target regions adjacent to each other exist;
    in response to determining that the at least two target regions exist, stitching at least two light sources contained in the at least two target regions into the light source contained in the scene; and
    in response to determining that the at least two target regions do not exist, determining the light source contained in the target region as the light source contained in the scene.

3. The method according to claim 2, wherein determining whether the region is the target region having the light source according to the histogram of the region comprises:
    determining whether a ratio of a number of pixels each with a pixel value greater than a predetermined value exceeds a predetermined ratio;
    when the ratio of the number of pixels each with the pixel value greater than the predetermined value exceeds the predetermined ratio, determining that the region is the target region having the light source according to the histogram of the region; and
    when the ratio of the number of pixels each with the pixel value greater than the predetermined value does not exceed the predetermined ratio, determining that the region is not the target region having the light source according to the histogram of the region.

4. The method according to claim 2, wherein processing the image to obtain the color of the light source contained in the scene corresponding to the image comprises:
    determining a first region and a second region according to a brightness distribution along a radial direction from a center of the light source contained in the scene; and
    subtracting averaged pixel values of primary color channels of the second region from averaged pixel values of the primary color channels of the first region to determine the color of the light source contained in the scene.

5. The method according to claim 4, wherein the first region is a region defined by pixels each having a brightness value within a first brightness range along the radial direction from the center of the main light source, the second region is a region defined by pixels each having a brightness value within a second brightness range along the radial direction from the center of the main light source, and an upper limit of the second brightness range is less than or equal to a lower limit of the first brightness range.

6. The method according to claim 5, wherein the first brightness range and the second brightness range are determined according to a brightness distribution along the radial direction from the center of light source.

7. The method according to claim 1, wherein determining whether the color of the light source is identical to the natural color of the object contained in the scene comprises:

determining whether the color of the light source is identical to the natural color of the object contained in the scene according to a ratio among pixel values of primary color channels for the color of the light source and a ratio among pixel values of primary color channels for a color of the object in the image.

8. The method according to claim 7, wherein the color of the object in the image is obtained by superimposing the color of the light source and the natural color of the object contained in the scene; and determining whether the color of the light source is identical to the natural color of the object contained in the scene comprises:

determining whether the color of the light source is identical to the color of the object in the image;

when the color of the light source is different from the color of the object in the image, determining that the color of the light source is different to the natural color of the object contained in the scene; and when the color of the light source is identical to the color of the object in the image, determining whether the color of the light source is identical to the natural color of the object contained in the scene according to the ratio among pixel values of primary color channels for the color of the light source and the ratio among pixel values of primary color channels for the color of the object in the image.

9. The method according to claim 7, wherein determining whether the color of the light source is identical to the natural color of the object contained in the scene according to the ratio among pixel values of primary color channels for the color of the light source and the ratio among pixel values of primary color channels for the color of the object in the image comprises:

determining whether the ratio among pixel values of primary color channels for the color of the light source is identical to the ratio among pixel values of primary color channels for the color of the object in the image;

in response to determining that the ratio among pixel values of primary color channels for the color of the light source is identical to the ratio among pixel values of primary color channels for the color of the object in the image, determining that the color of the light source is identical to the natural color of the object contained in the scene; and in response to determining that the ratio among pixel values of primary color channels for the color of the light source is different from the ratio among pixel values of primary color channels for the color of the object in the image, determining that the color of the light source is different from the natural color of the object contained in the scene.

10. The method according to claim 1, wherein determining whether the color of the light source is identical to the natural original color of the object contained in the scene comprises:

processing the image using a preset classifier to determine whether the color of the light source is identical to the natural color of the object contained in the scene.

11. The method according to claim 10, further comprising:

acquiring a plurality of frame images, each frame image comprises a first mark indicating that the color of the light source is identical to the natural color of object contained in the scene and a second mark indicating that the color of the light source is different from the natural color of object contained in the scene;

dividing the plurality of frame images into training samples and testing samples;

inputting the training samples into a classifier algorithm to generate a classifier;

inputting the testing samples into the classifier to obtain a predicted result indicating whether the color of the light source is identical to the natural color of the object contained in the scene; and correcting the classifier based on the predicted result to obtain the preset classifier.

12. The method according to claim 1, wherein determining the color temperature of the light source contained in the scene according to the color of the light source comprises:

determining the color temperature of the light source contained in the scene according to the color of the light source and a correspondence between colors of light sources and color temperature of the light sources, wherein the correspondence is selected from a group consist of a mapping table and a color temperature curve.

13. The method according to claim 1, wherein the natural color of the object contained in the scene refers to a color presented by the object contained in the scene under illumination of a standard white light.

14. An electronic device, comprising:
one or more processors;
a memory; and
one or more programs, stored in the memory and configured to be executable by the one or more processors;
wherein the one or more programs comprises instructions, the one or more processors are configured to:
process an image to obtain a color of a light source contained in a scene corresponding to the image;
determine whether the color of the light source is identical to a natural color of an object contained in the scene;
in response to determining that the color of the light source is identical to the natural color of the object contained in the scene, determine a type of the scene, determining, according to the type of the scene, a white balance parameter corresponding to the type of the scene from a correspondence between the type of the scene and the white balance parameter, and performing a white balance processing on the image according to the white balance parameter; and
in response to determining that the color of the light source is different from the natural color of the object contained in the scene, determine color temperature of the light source contained in the scene according to the color of the light source and perform the white balance processing on the image according to the color temperature of the light source.

15. The electronic device according to claim 14, wherein the one or more processors are configured to:
divide the image into a plurality of regions;
according to a histogram of each region, determine whether the region is a target region having the light source;
determine whether at least two target regions adjacent to each other are presented;
in response to determining that the at least two target regions are presented, stitch at least two light sources contained in the at least two target regions into the light source contained in the scene; and
in response to determining that the at least two target regions are not presented, determine the light source contained in the target region as the light source contained in the scene.

16. The electronic device according to claim 14, wherein the one or more processors are configured to process the image to obtain the color of the light source contained in the scene corresponding to the image by acts of:
- determining a first region and a second region according to a brightness distribution along a radial direction from a center of the light source contained in the scene; and
- subtracting averaged pixel values of primary color channels of the second region from averaged pixel values of the primary color channels of the first region to determine the color of the light source contained in the scene.

17. The electronic device according to claim 16, wherein the first region is a region defined by pixels each having a brightness value within a first brightness range along the radial direction from the center of the main light source, the second region is a region defined by pixels each having a brightness value within a second brightness range along the radial direction from the center of the main light source, and an upper limit of the second brightness range is less than or equal to a lower limit of the first brightness range.

18. The electronic device according to claim 14, wherein the one or more processors are configured to determine whether the color of the light source is identical to the natural color of the object contained in the scene by acts of:
- determining whether the color of the light source is identical to the natural color of the object contained in the scene according to a ratio among pixel values of primary color channels for the color of the light source and a ratio among pixel values of primary color channels for a color of the object in the image.

19. The electronic device according to claim 14, wherein the one or more processors are configured to determine whether the color of the light source is identical to the natural original color of the object contained in the scene by acts of:
- processing the image using a preset classifier to determine whether the color of the light source is identical to the natural color of the object contained in the scene.

20. A non-transitory computer readable storage medium, comprising computer programs cooperating with the electronic device,
- wherein the computer programs are executed by a processor to execute a white balance processing method, and the white balance processing method comprises:
- processing an image to obtain a color of a light source contained in a scene corresponding to the image;
- determining whether the color of the light source is identical to a natural color of an object contained in the scene;
- in response to determining that the color of the light source is identical to the natural color of the object contained in the scene, determining a type of the scene determining, according to the type of the scene, a white balance parameter corresponding to the type of the scene from a correspondence between the type of the scene and the white balance parameter, and performing a white balance processing on the image according to the white balance parameter; and
- in response to determining that the color of the light source is different from the natural color of the object contained in the scene, determining color temperature of the light source contained in the scene according to the color of the light source and performing the white balance processing on the image according to the color temperature of the light source.

* * * * *